AUTOMATIC PHONOGRAPH, INCLUDING A RECORD SIZE-CONTROL LOCK

Filed Oct. 10, 1950

IVENTORS
RALPH A. MULLANEY
OTTO E. WAGENKNECHT
BY Francis W. Crotty
THEIR ATTORNEY

United States Patent Office 2,698,182

Patented Dec. 28, 1954

2,698,182

AUTOMATIC PHONOGRAPH, INCLUDING A RECORD SIZE-CONTROL LOCK

Ralph A. Mullaney, Elmwood Park, and Otto E. Wagenknecht, Chicago, Ill., assignors to Zenith Radio Corporation, a corporation of Illinois

Application October 10, 1950, Serial No. 189,378

5 Claims. (Cl. 274—10)

This invention relates, in general, to automatic phonographs adapted to accommodate record discs of different diameters, and pertains more particularly to an improved record-size control that may be preset to any one of a plurality of operating positions in accordance with the size record to be played.

The record-size control of one prior type of automatic phonograph comprises a member having a series of steps or position-determining surfaces, each related to a given one of a plurality of record diameters, and this member is supported for movement so that it may be adjustably fixed in any of a plurality of operating positions. In each of these positions, one of the steps is in the path of movement of an element coupled to the tone arm. A manual control member permits the size control to be preset to any selected position in accordance with the size record that is to be played.

Upon the completion of a record-playing cycle, a change cycle is initiated in which the tone arm moving mechanism of the apparatus displaces the tone arm from record-tracking engagement with the played record to facilitate loading a new record into playing position on the turntable. At the completion of the record-changing cycle, the tone arm is returned toward a record-tracking position and a selected one of the position-determining steps of the record-size control arrests the return movement of the tone arm in a position for engaging the starting groove of the new record.

If the operator inadvertently actuates the manual control member during the record-changing cycle, the tone arm may not be accurately positioned in the starting groove of the new record. Moreover, it has been discovered from actual experience with certain automatic phonograph mechanisms that, if the manual control is actuated during particular portions of the record-changing cycle, the resulting forces acting on the tone arm greatly accelerate its movement. In some cases, the tone arm is driven against the spindle of the phonograph with great velocity and may be permanently damaged.

Therefore, it is an object of this invention to provide an improved automatic phonograph that is not subject to the afore-described deficiency.

It is another object of the invention to provide an automatic phonograph having a locking arrangement for the record-size control to prevent movement of this control during a record-changing cycle.

In accordance with the invention, an automatic phonograph adapted to accommodate record discs of different diameters comprises a tone arm, an indexing member fixed to the tone arm, and a tone-arm moving mechanism operative during a record-changing cycle for displacing the tone arm from a record-tracking position at the start of each cycle to a record loading position, and for returning the tone arm toward a record-tracking position at the completion of its record-changing cycle. The phonograph further comprises an adjustably fixed record-size control having a plurality of operating positions in each of which a selected portion of the size control intercepts the indexing member, arrests the return movement of the tone arm and determines its restored position at the completion of the record-changing cycle. Means are provided for selectively actuating the size control to any of its aforesaid operating positions. The automatic phonograph further comprises a locking element normally maintained in an inoperative position, but movable to a locking position in which it prevents movement of the size control with respect to the aforesaid operating positions thereof and an actuating member driven in timed relation to the tone-arm moving mechanism for moving the locking element to its locking position during each cycle of the tone-arm moving mechanism.

The features of the present invention which are believed to be novel are set forth with particularity in the appended claims. The present invention itself, both as to its organization and manner of operation, together with further objects and advantages thereof may best be understood by reference to the following description taken in connection with the accompanying drawing in which:

Figures 1, 2, 3:
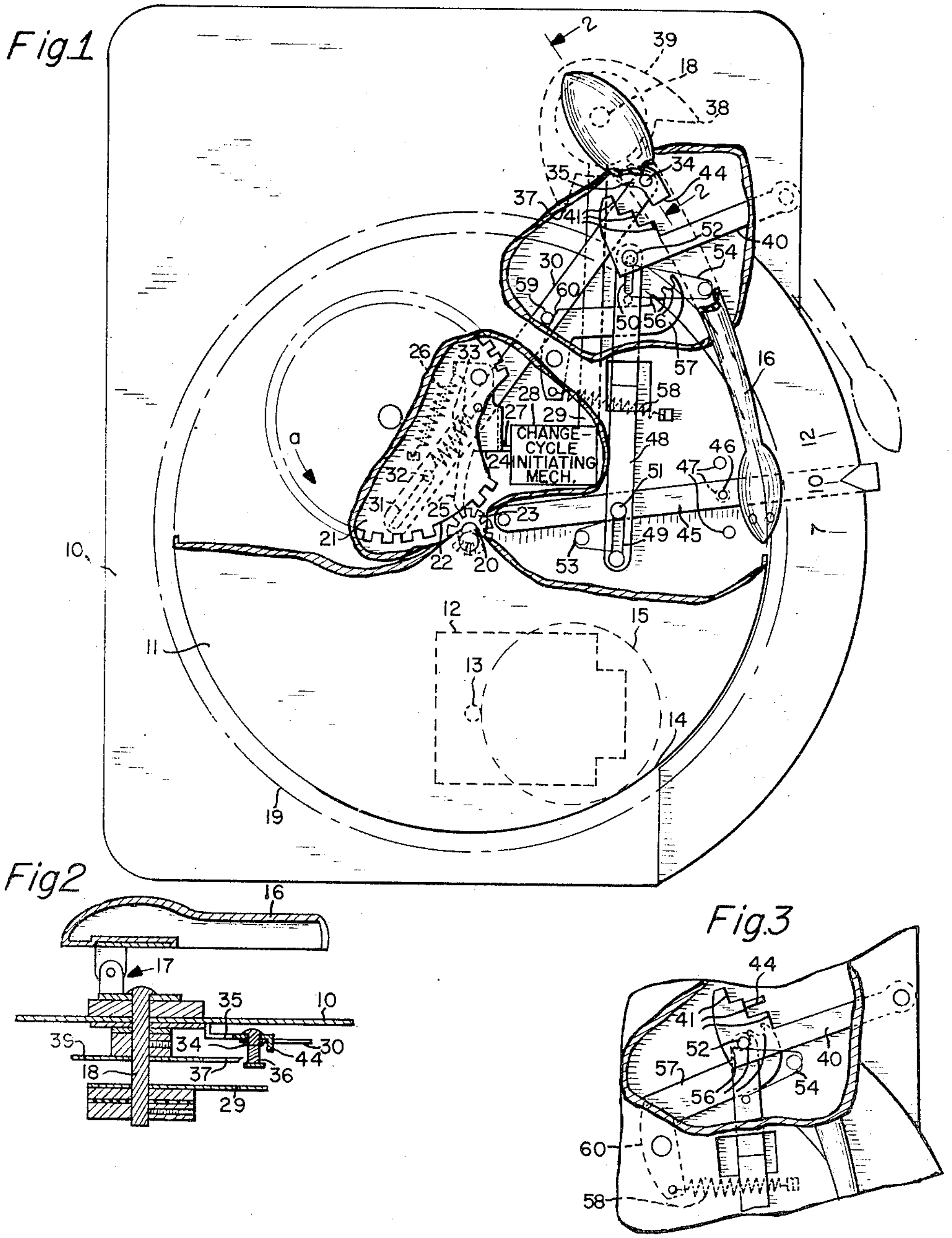
Fig. 1 is a plan view, partly in block, of an automatic phonograph embodying the invention, portions of the instrument being shown cut away to reveal details of the invention.
Fig. 2 is a sectional view taken along line 2—2 of Fig. 1.
Fig. 3 represents a portion of the apparatus of Fig. 1, certain of the elements being illustrated in another operating condition.

Referring now to Fig. 1, the phonograph there represented includes a mounting base 10 upon which a turntable 11 is supported for rotation. A driving motor 12, shown in outline, is supported by base 10 beneath turntable 11 and includes a driving shaft 13 mechanically coupled with the inner side of a rim 14 of the turntable through an idler gear 15. Driving motor 12 is of the synchronous, constant-speed variety and the rotational speed of turntable 11 is determined by the diameters of shaft 13 and rim 14 in well-known manner.

As may be best seen in Fig. 2, a tone arm 16 is supported on base 10 for pivotal movement about a horizontal axis by a hinge 17 which is fixed to one end of a rotatably mounted, vertical shaft 18. The tone arm is arranged to track the groove of a record disc 19, shown in dash-dot outline in Fig. 1 and centered on turntable 11 by a spindle 20. It is also movable in response to the actuation of a tone-arm moving mechanism described hereinafter.

A driven gear 21, rotatably supported at the under side of base 10, is provided with a gap or discontinuity 22 in its peripheral teeth. In the illustrated position of gear 21, gap 22 is adjacent a driving gear 23 that is supported within an opening in base 10 below and coaxial with turntable 11 for rotation therewith. A bell crank lever 24 is pivoted at one end to the under side of gear 21 and is provided with an end portion 25 shaped essentially like one of the teeth of gear 21. A spring 26 biases crank 24 in a counterclockwise direction to urge tooth 25 toward the periphery of gear 21. An actuator 27 normally maintains lever 24 in the position shown, against the bias of spring 26, and is movable under the control of a change-cycle initiating mechanism 28 to an actuated position allowing movement of lever 24.

The change-cycle initiating mechanism is also coupled with tone-arm shaft 18 through a lever 29 and it is operated in response to the completion of the playing of record 19 by the tone arm. In particular, this mechanism may be of the type which is actuated in response to an increase in tone-arm velocity as the tone arm tracks from the information-carrying portion of the record groove into the terminating groove portion of high pitch. An arrangement of that type, suitable for use in the phonograph under consideration is illustrated in a copending application of Ralph A. Mullaney, Serial Number 188,677, filed October 6, 1950, now U. S. Patent No. 2,668,058, and assigned to the same assignee as the instant invention.

The tone-arm moving mechanism of the phonograph includes a crank lever 30 having an elongated slot 31 at one extremity which receives a pin 32 fixed to the under side of gear 21. Pin 32 is of sufficient length that lever 30 may be supported below and clear of member 24. A biasing spring 33 connected to pin 32 and anchored to lever 30 causes the pin normally to abut one end of slot 31 as shown. The opposite end of lever 30 is pivoted by a pin 34 to one end of an arm 35 that is supported for rotation about tone arm shaft 18 as shown in Fig. 2. A downwardly projecting extension 36 of pin 34 is positioned between the legs 37 and 38 of an essentially horseshoe-shaped member 39 fixed at its bight end to shaft 18.

The connections just described are effective during a record-changing cycle to displace tone arm 16 from a record-tracking position at the start of the cycle and to return the arm toward a record-tracking position at the completion of the cycle.

Means (not shown) coupled between gear 21 and tone arm 16 are provided for effecting the usual lifting and lowering movements of the tone arm. The customary record ejector of a record magazine (not shown) positioned above turntable 11 is also coupled to gear 21 for actuation thereby. Since the construction and operating functions of the record ejector and tone-arm lifting and lowering means are well known and, per se, constitute no part of the subject invention, a detailed description thereof is deemed unnecessary.

In order to determine the restored position of the tone arm at the completion of a record-changing cycle, there is provided an adjustably fixed record-size control 40 pivoted at one end to the under side of base 10 and having at the other end a series of three steps 41. The selective displacement of member 40 introduces any one of the steps 41 in the path of movement of a finger or indexing member 44 projecting downwardly from the free extremity of arm 35 to determine the position to which tone arm 16 is restored at the completion of a record-changing cycle. As illustrated, lever 40 has three operating positions related to record disc diameters of 7, 10 and 12 inches, respectively, although any other number of steps may be provided.

A manual control member in the form of a lever 45 is pivoted at one end to the upper side of base 10 and carries at its other end a pointer arranged to traverse a record-size scale inscribed on the mounting base. By means of a downwardly struck projection 46 disposed to cooperate with a series of recesses 47, lever 45 is detented in each of three operating positions respectively related to the three operating positions of size control 40. Member 45 provides the means for selectively actuating size control 40 to any of its aforesaid operating positions through a mechanical connection which extends between control 40 and member 45.

The mechanical connection between elements 40 and 45 includes an elongated link 48 having one of a pair of pin-receiving solts 49 and 50, at each end. Link 48 extends in part along the upper surface of base 10 so that slot 49 may receive a pin 51 fixed to manual control member 45. The vertical section of an S-shaped intermediate portion of link 48 projects through an enlarged opening in base 10 and the remainder of the link extends along the under side of the base, slot 50 receiving a pin 52 which extends downwardly from the stepped portion of size control 40. Springs 53 and 54 coupled between the pins 51 and 52 and member 48 bias the pins in the same direction relative to link 48 to maintain size control 40 and control member 45 releasably locked in a normal aspect. However, the pin and slot connections allow relative movement between elements 40 and 45 in opposite directions from this normal aspect.

An extension of pin 52 may be received, for any position of size control 40, by one of a plurality of surfaces 56 provided at one end of a locking element 57 pivoted to the under side of base 10. Element 57 is movable from a normal position, indicated in Fig. 1, to a locking position, illustrated in Fig. 3, in which one of the surfaces 56 engages pin 52 to prevent movement of size control 40 with respect to its operating positions. A spring 58 biases element 57 in a counterclockwise direction toward its locking position but a movable abutment 59 is normally disposed in the path of a shoulder 60 of locking element 57 to maintain that element in its normal position, against the bias of spring 58. Abutment 59 is in the form of a stud fixed to crank lever 30 and moves with the lever during a record-changing cycle to a second position in which it is out of the path of locking element 57. This arrangement in conjunction with spring 58 provides the means for displacing element 57 to its locking position during each cycle of the tone-arm moving mechanism.

In setting up the phonograph for operation, lever 45 is manipulated to place its pointer at the appropriate calibration of the record diameter scale. Since springs 53 and 54 maintain control 40 and lever 45 in a normal relative aspect, control 40 is displaced into a corresponding operating position. In the condition of the apparatus illustrated in Fig. 1, the pointer is disposed adjacent the scale marking corresponding to a record diameter of 10 inches and control 40 is positioned so that the intermediate one of the steps 41 is in an operative position.

Let it now be assumed that motor 12 is rotating turntable 11 at a speed suitable for reproducing record 19 and that tone arm 16 is tracking the information-carrying portion of the record groove. Neglecting for the moment, the operation of lock 57, at the completion of the record-playing cycle, the tone arm tracks into the terminating, high pitched portion of the record and a record-changing cycle is initiated by mechanism 28 which responds to this movement of the tone arm as is well understood in the art. At the start of this cycle, bell crank 24 is released and a driving connection established between driving gear 23 and the segmented, single-revolution gear 21. Gear 21 rotates in the direction of arrow *a* and as tone arm 16 is lifted from the record groove, pin 32 drives lever 30 in a direction to rotate arm 35 in a counterclockwise direction with respect to shaft 18. Pin extension 36 engages leg 38 to rotate member 39 in a counterclockwise direction, thereby displacing tone arm 16 away from spindle 20 to a position, shown in dash-dot-dot outline, clear of the largest size record that is accommodated by the phonograph. In this interval of the operating cycle, pin 32 is at its closest position to shaft 18 so that further movement of gear 21 in its single-revolution cycle effects rotation of lever 35 in a clockwise direction. The record ejector (not shown) is operated to deposit a new record atop disc 19 during the period in which pin 36 travels from leg 38 into engagement with leg 37 to rotate member 39 and tone arm 16 in a clockwise direction. Tone arm 16 thus is driven toward spindle 20 and comes to rest when finger 44 engages the intermediate one of steps 41. In this last portion of the record-changing cycle, the tone arm is lowered to engage the starting section of the groove of the new record disc at the same time gear 21 rotates toward its resting position. Since the engagement of step 41 by finger 44 prevents further movement of link 30, pin 32 travels within slot 31 against the bias of spring 33. This lost motion connection, including slot 31 and pin 32, provides the means by which gear 21 completes its operating cycle regardless of the arrested position of finger 44, and hence the system functions properly for each of the steps 41.

Referring once again to the initial phase of a record-changing cycle wherein link 30 is displaced in a longitudinal direction due to the action of pin 32 as gear 21 rotates, stud 59 is carried from engagement with shoulder 60 of locking element 57 and spring 58 is able to displace the locking element into its locking position, illustrated in Fig. 3. Abutment 59 is clear of shoulder 60 during substantially the entire change cycle and consequently the locking element 57 is in locking engagement with the pin 52 of size control 40. If the operator attempts to manipulate lever 45 in either direction from the position shown while the lock 57 is engaged, the pins 51 and 52 and slots 49 and 50 cause lever 45 to be displaced relative to size control 40 which remains stationary. At the completion of a record-changing cycle, stud 59 engages shoulder 60 and locking element 57 is returned to its normal position. This movement of the locking element releases size control 40 so that member 45 may be adjusted to accommodate records of varying sizes.

In the automatic phonograph of the instant invention, the record-size control is locked against movement during each record-changing cycle. Consequently, the repositioning of the tone arm at the completion of a record-change cycle may not be upset, nor does there exist any operating condition in which the tone arm may be damaged as a result of displacement of the manual control member. At the same time, the record-size control is released for adjustment at all times other than a record-changing cycle.

While a particular embodiment of the present invention has been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. An automatic phonograph adapted to accommodate record discs of different diameters, comprising: a tone arm; an indexing member fixed to said tone arm; a tone arm moving mechanism operative during a record-changing cycle for displacing said arm from a record-tracking position at the start of said cycle to a record-loading position and for returning said arm toward a record-tracking position at the completion of said cycle; an adjustably fixed record-size control having a plurality of operating positions in each of which a selected portion of said size control intercepts said indexing member and arrests the return movement of said arm and determines its restored position at the completion of said record-changing cycle; means for selectively actuating said size control to any of its aforesaid operating positions; a locking element normally maintained in an inoperative position but movable to a locking position in which it prevents movement of said size control with respect to the aforesaid operating positions thereof; and an actuating member driven in timed relation to said tone arm moving mechanism for moving said locking element to its locking position during each cycle of said tone-arm moving mechanism.

2. An automatic phonograph adapted to accommodate record discs of different diameters, comprising: a tone arm; an indexing member fixed to said tone arm; a tone-arm moving mechanism operative during a record-changing cycle for displacing said arm from a record-tracking position at the start of said cycle to a record-loading position and for returning said arm toward a record-tracking position at the completion of said cycle; an adjustably fixed record-size control having a plurality of operating positions in each of which a selected portion of said size control intercepts said indexing member and arrests the return movement of said arm and determines its restored position at the completion of said record-changing cycle; a movable control member for selectively actuating said record-size control to any of its aforesaid operating positions; a mechanical connection extending between said record-size control and said movable member and permitting relative movement therebetween in opposite directions from a normal aspect; means for maintaining said record-size control and said movable member releasably locked in said normal aspect; a locking element normally maintained in an inoperative position but movable to a locking position in which it prevents movement of said size control with respect to the aforesaid operating positions thereof; and an actuating member driven in timed relation to said tone arm moving mechanism for moving said locking element to its locking position during each cycle of said tone-arm moving mechanism.

3. An automatic phonograph adapted to accommodate record discs of different diameters, comprising: a tone arm; a tone-arm moving mechanism operative during a record-changing cycle for displacing said arm from a record-tracking position at the start of said cycle to a record-loading position and for returning said arm toward a record-tracking position at the completion of said cycle; an adjustably fixed record size control having a plurality of operating positions in each of which a selected portion of said size control intercepts the return path of said arm and arrests the return movement of said arm and determines its restored position at the completion of said record-changing cycle; a movable control member for selectively actuating said record-size control to any of its aforesaid operating positions; a mechanical connection extending between said record-size control and said movable member, including an elongated link having pin-receiving slots at each end and a pair of pins fixed to said record-size control and to said movable member, and received by said slots; spring means biasing said pins in the same direction relative to said link to maintain said record-size control and said movable member releasably locked in a normal aspect; a locking element normally maintained in an inoperative position but movable to a locking position in which it prevents movement of said size control with respect to the aforesaid operating positions thereof; and an actuating member driven in timed relation to said tone arm moving mechanism for moving said locking element to its locking position during each cycle of said tone-arm moving mechanism.

4. An automatic phonograph adapted to accommodate record discs of different diameters, comprising: a tone arm; an indexing member fixed to said tone arm; a tone arm moving mechanism operative during a record-changing cycle for displacing said arm from a record-tracking position at the start of said cycle to a record-loading position and for returning said arm toward a record-tracking position at the completion of said cycle; an adjustably fixed record size control having a plurality of operating positions in each of which a selected portion of said size control intercepts said indexing member and arrests the return movement of said arm and determines its restored position at the completion of said record-changing cycle; means for selectively actuating said record-size control to any of its aforesaid operating positions; a projection extending from said record-size control; a locking element including a plurality of projection-receiving recesses normally maintained in an inoperative position but movable to a locking position in which one of said recesses receives said projection to prevent movement of said record-size control with respect to the aforesaid operating positions thereof; and an actuating member driven in timed relation to said tone arm moving mechanism for moving said locking element to its locking position during each cycle of said tone-arm moving mechanism.

5. An automatic phonograph adapted to accommodate record discs of different diameters, comprising: a tone arm; a tone-arm moving mechanism operative during a record-changing cycle for displacing said arm from a record-tracking position at the start of said cycle to a record-loading position and for returning said arm toward a record-tracking position at the completion of said cycle; an adjustably fixed record size control having a plurality of operating positions in each of which a selected portion of said size control intercepts the return path of said arm and arrests the return movement of said arm and determines its restored position at the completion of said record-changing cycle; means for selectively actuating said size control to any of its aforesaid operating positions; a locking element movable from a normal position to a locking position in which it prevents movement of said size control with respect to the aforesaid operating positions thereof; spring means urging said locking element toward its aforesaid locking position; and a stop abutment maintaining said locking element in its normal position against the bias of said spring means but movable with said tone-arm moving mechanism to clear said locking element during the start of each cycle of said mechanism and to restore said locking element to its normal position at the end of each such cycle.

References Cited in the file of this patent

UNITED STATES PATENTS

| Number | Name | Date |
|---|---|---|
| 1,942,613 | Nystrom | Jan. 9, 1934 |
| 1,968,927 | Buckle | Aug. 7, 1934 |
| 2,191,215 | Lannerd | Feb. 20, 1940 |
| 2,307,030 | Erwood | Jan. 5, 1943 |